(12) United States Patent
Parmley

(10) Patent No.: US 6,843,448 B2
(45) Date of Patent: Jan. 18, 2005

(54) LIGHTER-THAN-AIR TWIN HULL HYBRID AIRSHIP

(76) Inventor: Daniel W. Parmley, 5045 S. 33$^{rd}$ St., Phoenix, AZ (US) 85040

( * ) Notice: Subject to any disclaimer, the term of this patent is extended or adjusted under 35 U.S.C. 154(b) by 0 days.

(21) Appl. No.: 10/672,760

(22) Filed: Sep. 27, 2003

(65) Prior Publication Data

US 2004/0104304 A1 Jun. 3, 2004

Related U.S. Application Data

(60) Provisional application No. 60/415,167, filed on Sep. 30, 2002.

(51) Int. Cl.$^7$ ................................................ B64B 1/02
(52) U.S. Cl. ............................ 244/30; 244/96; 244/125
(58) Field of Search .............................. 244/24, 30, 31, 244/96, 125

(56) References Cited

U.S. PATENT DOCUMENTS

| 889,693 A | * | 6/1908 | Lake | ........................... 244/30 |
| 6,581,873 B2 | * | 6/2003 | McDermott | .................. 244/25 |

* cited by examiner

*Primary Examiner*—J. Woodrow Eldred
(74) *Attorney, Agent, or Firm*—Keith L. Jenkins

(57) ABSTRACT

An airship is provided including a frame and first and second hulls pivotally connected to said frame. An airship second is provided including a frame, a gondola disposed within said frame, first and second hulls pivotally connected to said frame, and a propulsion system connected to said frame. Methods are provided for landing on water and refueling.

30 Claims, 18 Drawing Sheets

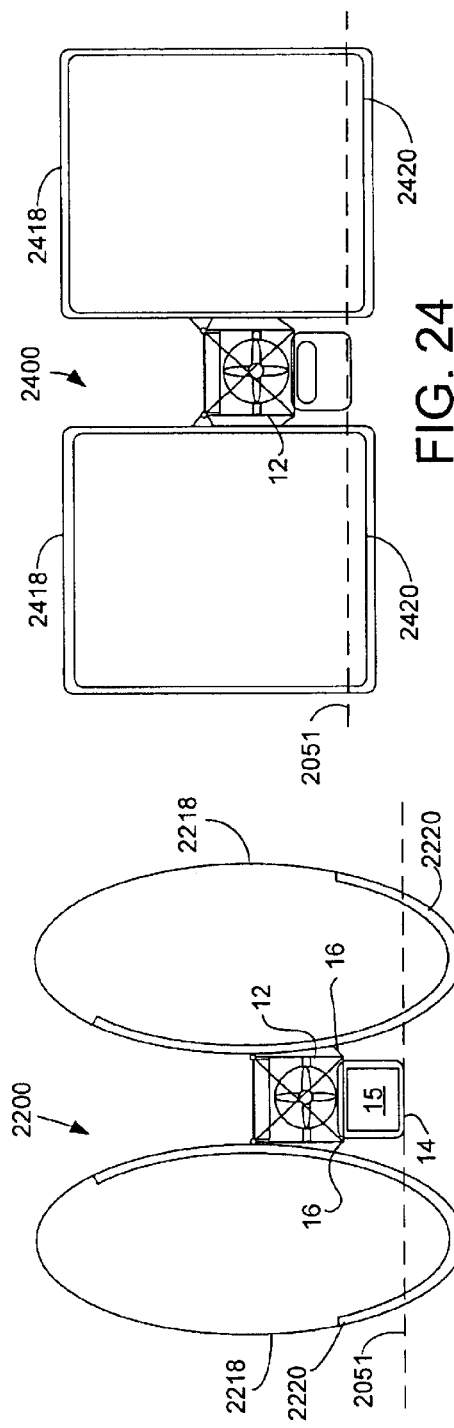

US 6,843,448 B2

LIGHTER-THAN-AIR TWIN HULL HYBRID AIRSHIP

This application claims the benefit of U.S. Provisional Application No. 60/415,167 filed Sep. 30, 2002.

FIELD OF THE INVENTION

The present invention relates to a multi-use hybrid vehicle capable of operation in various environments as an aerial vehicle, as a watercraft, and as a terrestrial habitation. More particularly, the present invention relates to lighter-than-air airship having inflatable twin hulls pivotably attached to a frame. The frame also supports a retractable gondola and power and propulsion units which permit precise control in various operating environment. The hulls and gondola are interchangeable adaptive to particular operating environments. With the hulls removed or deflated, the vehicle may be operated as a heavier-than-air craft similar to a helicopter. Frames are also interchangeable adaptive to particular needs.

BACKGROUND OF THE INVENTION

Lighter-than-air aircraft include blimps, dirigibles, and balloons, all of which are varieties of aerostats. Blimps are aerodynamically shaped balloons with propulsion units and optionally with gondolas. The Goodyear blimp is a well-known example of a blimp. Dirigibles are rigid airships where the outer gas-containing envelope, or hull, has a rigid frame, and the lifting gas is contained in one or more gas bags therein. The Hindenberg is a well-known example of a dirigible. Blimps and dirigibles are referred to collectively as airships. Balloons typically do not have lateral propulsion systems, relying instead on lifting or descending into desirably-directed air currents. Hot air balloons are well known. Lighter-than-air aircraft obtain lift from buoyant forces exerted by the atmosphere on a hull substantially filled with a light-weight gas such as hydrogen or helium. Important economies are available from airships as compared to fixed-wing aircraft which must burn fuel to generate lift.

There are various current airship designs, some of which reprise older designs with updated materials and technology and others generally based on hybrid designs using buoyant airfoils. Airships are used in a variety of applications including surveillance, observation, heavy cargo, and transportation.

BRIEF SUMMARY OF THE INVENTION

One embodiment of the present invention provides an airship including a frame and first and second hulls pivotally connected to said frame. A second embodiment of the present invention provides an airship including a frame, a gondola disposed within said frame, first and second hulls pivotally connected to said frame, and a propulsion system connected to said frame. A method of landing on water is provided.

BRIEF DESCRIPTION OF THE DRAWINGS

The above and other objects and advantages of the present invention will become more apparent from the following description taken in conjunction with the following drawings in which:

FIG. 22 is an end view of another exemplary airship having hulls adapted to water landings with the hulls pivoted to a water-landing position;

FIG. 23 is an end view of an exemplary airship of FIG. 22 having hulls adapted to water landings with the hulls pivoted to a flight position;

FIG. 24 is an end view of yet another exemplary airship having hulls adapted to water landings with the hulls pivoted to a water-landing position;

FIG. 25 is an end view of still yet another exemplary airship having hulls adapted to water landings with the hulls pivoted to a water-landing position.

DETAILED DESCRIPTION OF THE DRAWINGS

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
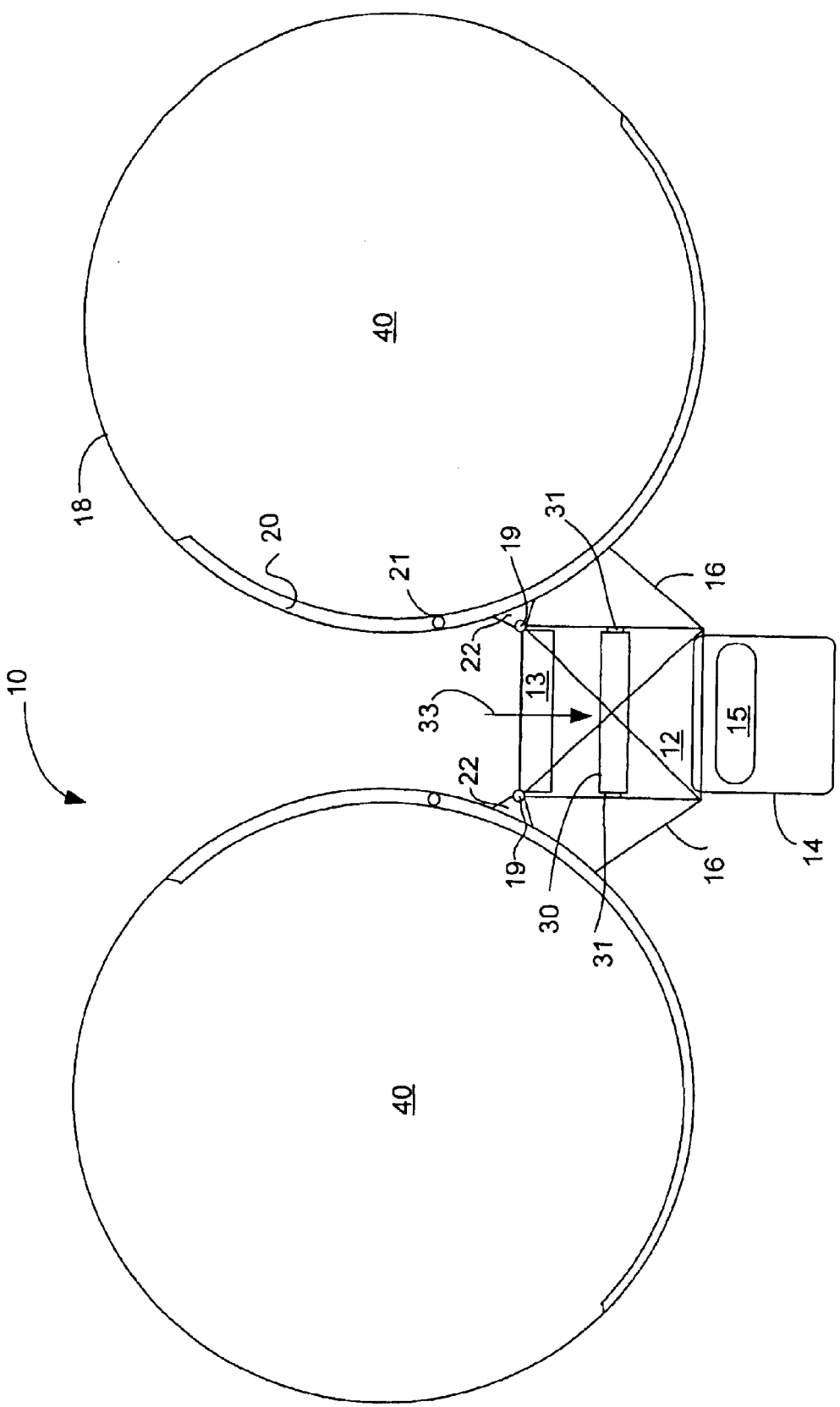
FIG. 1 is an end view of an exemplary embodiment of the airship configured for vertical thrust.

Turning now to FIG. 1, one exemplary embodiment of the airship 10 is shown having a center frame 12 supporting an extendable and retractable gondola 14, vectored thrusters 30, and first and second semi-dirigible hulls 18, each having hull structures 20 pivotably connected to the frame 12. The center frame 12 is the main connection element for the entire airship 10. The center frame 12 has a framework structure made of high-strength light-weight materials. For example, the center frame 12 may be made of aluminum, titanium, carbon or boron reinforced resins, and the like. The center frame 12 is shown as a rectangular prism frame but other shapes may be used. For example, triangular or trapezoidal prism frames may be used. Other configurations of frame 12 are contemplated. For example, a frame 12 similar to those used in ultralite aircraft may be used in a particular exemplary embodiment. The center frame 12 may have two longitudinal spars 19 for pivotably connecting to the first and second hull structure 20 or may otherwise have pivotal connecting members. For example, with a rectangular center frame 12, the top longitudinal edges may be the longitudinal spars 19. Other conventional pivotal connections are also contemplated. The center frame 12 also has adaptations for attaching the vectored propulsion units 30 and other elements of the propulsion system, such as fuel tanks.

Figure 2:
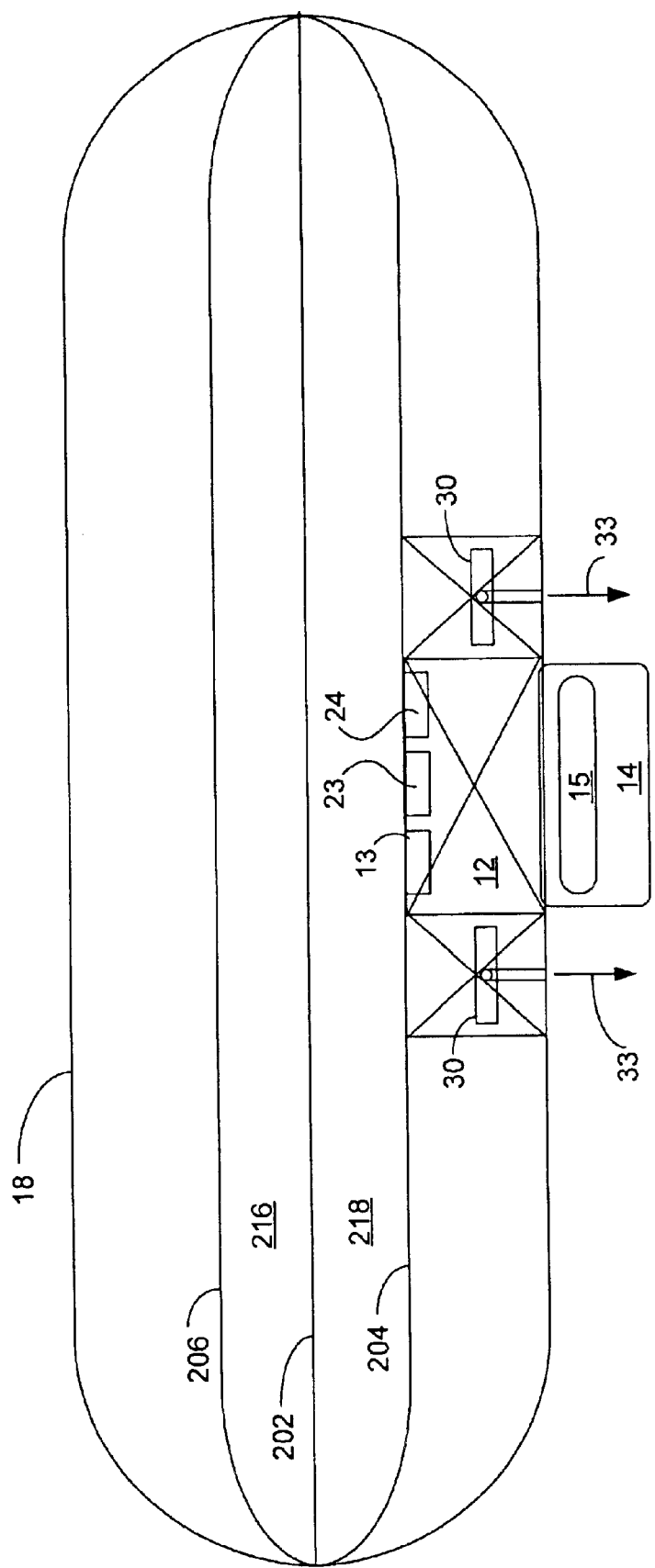
FIG. 2 is a side sectional view of the exemplary embodiment of the airship of FIG. 1.
Figure 3:
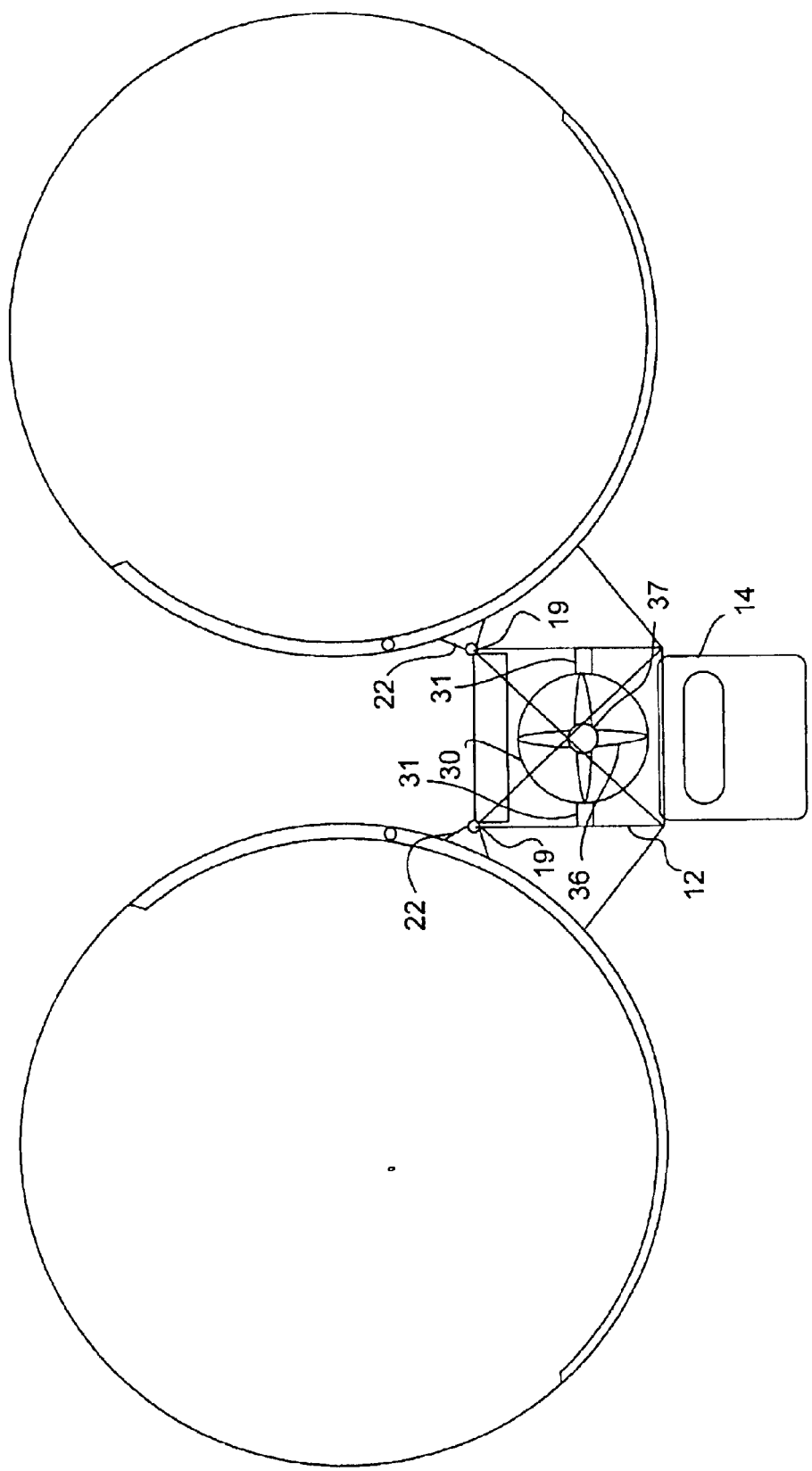
FIG. 3 is an end view of the exemplary airship of FIG. 1 configured for lateral thrusting.
Figure 4:
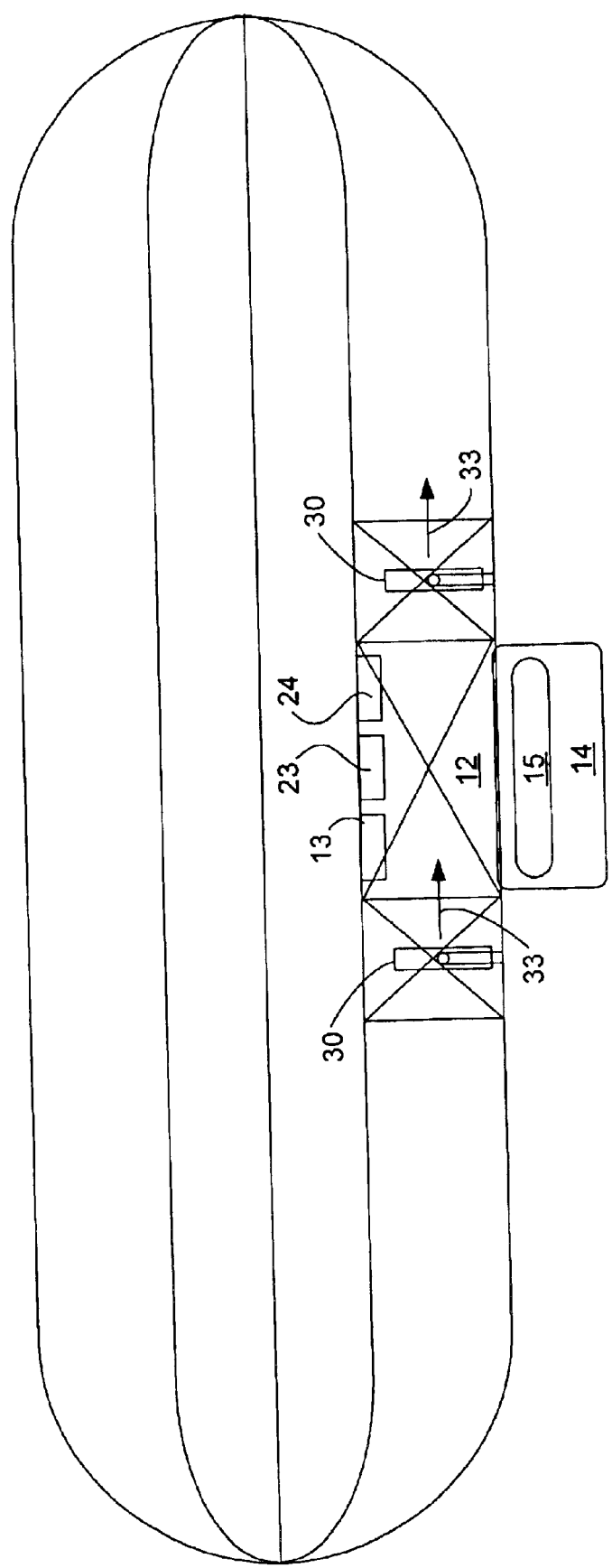
FIG. 4 is a side sectional view of the exemplary airship of FIG. 1 configured for lateral thrusting.

The center frame 12 may contain a gondola 14 which may be extended vertically from the frame 12 as shown in FIGS. 1 and 2 and then retracted back into the frame 12 as shown in FIGS. 3 and 4 as desired. For example, the gondola 14 may be extended for landing to allow ground personnel access to openings in the gondola 14 such as doors or windows 16 without interference from the frame 12. For another example, the gondola 14 may be extended in flight to allow a less obstructed view for tourist passengers or sensors from the gondola 14 to points of interest on the Earth's surface or elsewhere. The gondola 14 may be locked to the frame 12 in the retracted and in the extended positions. In some embodiments, gondola 14 may be an ISO cargo container. Gondola 14 may contain passive cargo or various active payloads such as scientific experiments for atmospheric research, sensor suites for border patrolling, communications relay equipment such as for a cellular telephone network, passengers, flight crew, or special purpose propulsion equipment. In a particular embodiment, the retraction and extraction mechanism may include passive air cylinders employed as dampers which allow the gondola 14 to descend by gravity as the airship 10 lifts off from the ground and allow the gondola 14 to retract as the airship 10 lands.

The pivotably connected hull structures 20 may be pivoted independently or in concert. By pivoting the hull structure 20, the entire hull 18 is pivoted. Pivoting may be achieved by extending or contracting actuators 16 which are pivotably mounted to the frame 12 and the hull structure 20. Actuators 16 may be, for example, hydraulic or pneumatic cylinders or jacks such as screw jacks or scissor jacks. It is desirable for the actuators 16 to have minimum weight and power requirements. By differentially pivoting the hulls 18, a roll bias of the airship 10 may be created as a correction against certain side wind effects, for pointing sensors mounted in the gondola 14 to extend their field of regard, or to improve the exposure of hull-mounted photovoltaic arrays 1502 (FIG. 15), as will be discussed in more detail below. In a particular embodiment, actuator 16 may include a retractable flexible cord or web which is wound up on a spool at the frame 12 end of actuator 16 to lower the hull 18 and unwound to allow buoyancy to lift the hull 18.

Each hull structure 20 is illustrated as foldable shell structure which may be monocoque, a truss structure, or the like, pivotably coupled to the frame 12 by standoffs 22. In a particular embodiment, the hull structure 20 may not be foldable. In some embodiments, hulls 18 may be detachable and interchangeable. While the hulls 18 are shown as smooth, some embodiments include various features, such as aerodynamic surfaces as part of the hull 18. In a particular embodiment, one or more aerodynamic surfaces may be coupled to the frame 12. Each hull 18 may have various exterior features. For example, along the outer surfaces where the hulls may touch in the fully raised position, connectors may be added to secure the relative positions of the hulls. For further example, cleats may be added to a portion of the hulls 18 which rest on the ground during a three-point landing (two hulls 18 and the gondola 14 or frame 12).

First and second hulls 18 each have at least one internal chamber 40 filled with a lighter-than air gas, or lifting gas, or gas mixture at a pressure just slightly greater than the ambient atmospheric pressure. For example, at least one chamber 40 may be filled with hydrogen, helium, hot air, or a hydrogen-helium mix. In a particular embodiment, waste heat from one or more propulsion units 30 may be coupled into chamber 40 to minimize the mass of the lifting gas needed to maintain the desired pressure. When used in certain dense planetary atmospheres other than Earth's, other gases may be useful as lifting gases for airship 10. Hull structures 20 may have two or more sections which may be pivoted about spars 21 to collapse the hull 18, as will be described in more detail below.

When pivoted upward, the hulls 18 place the center of buoyant lift above the center of mass of the airship 10, thereby achieving a stable configuration in flight. When pivoted downward, the hulls 18 may or may not create an unstable flight condition. Extending the gondola 14 may sufficiently lower the center of mass of airship 10 to keep the center of mass below the center of buoyant lift even with the hulls 18 lowered. In a particular embodiment, the extent to which the hulls 18 may be pivoted to a lower position may be limited or controlled to ensure a stable flight configuration.

Frame 12 supports at least one component rack 13, which may hold a fuel or power system component, life support equipment, communications equipment, flight control systems, and the like. In an alternate embodiment, at least one component rack 13 is contained in the gondola 14. Frame 12 also supports one or more vectored propulsion units 30 which may be vectored by pivoting on gimbals 31. The one or more propulsion units 30, shown vectored for lifting airship 10 in FIGS. 1 and 2, forces an air flow in direction 33 to create a reaction force in the airship 10. Operating one or more propulsion units 30 may change the overall center of lift of airship 10 to change the relationship of the center of mass with the center of lift, including allowing a stable flight configuration when the center of buoyant lift alone would not suffice.

Propulsion unit 30 may be powered by an electrical motor and may be run in reverse as a wind generator, when desired. In a particular embodiment, propulsion unit 30 may be rotated above the frame to act as a wind generator. Alternatively, propulsion unit 30 may be any conventional type of aircraft engine. For example, a turbine engine may be used. It may be desirable to have a propulsion unit 30 which is fueled by hydrogen on an embodiment of airship 10 using hydrogen as a lifting gas, as the material handling equipment is similar for both purposes.

FIG. 2 is a side view of the airship 10 with one hull 18 removed for aid in viewing. Additional components 23 and 24 are shown supported by the frame 12 proximate to component 13. Various configurations of components 13, 23, and 24 are possible, taking into consideration balance, weight, thermal, and structural considerations. One configuration of components 13, 23, and 24 is depicted in the figures, but is not a limitation of the present invention. For example, components may be mounted on the exterior of the side walls of frame 12. FIG. 2 also shows exemplary spars 202, 204, and 206 of the hull structure 20 of the semi-dirigible airship 10. In an exemplary embodiment, spar 19 of the frame 12 as shown in FIG. 1 may pivotably connect to spar 204 via standoff 22 and pivot 19. Spar 202 may pivotably connect hull structure 20 sections 216 and 218 for collapsing the hulls 18 in a landed condition, as will be described further below. In some embodiments, spar 19 of frame 12 pivotably connects to structural elements of hull structure 20 which are not spars. For example, spar 19 may connect pivotably to struts or joints within hull structure 20. In a particular example, frame 12 may be pivotably connected to hull 18 by one or more belts or webs around the external surface of hull 18 which are engaged by an actuator on frame 12 to pivot the hull 18. FIG. 2 also shows a second propulsion unit 30 which acts in concert with or independently of the first propulsion unit 30 shown in FIG. 1. Opening 15 in gondola 14 is depicted as a window in FIG. 2 but may represent any opening or plurality of openings, with or without closures, such as doors, ramp-doors, bi-fold doors, openings for sensor extensions, vents, exhausts, drains, and the like. Such openings 15 may be in the side of gondola 14, on an end of gondola 14 such as window 13, or even in the roof or floor of gondola 14.

FIG. 3 shows propulsion unit 30 vectored for lateral propulsion on gimbals 31. Propulsion unit 30 is shown as a propeller 36 driven by a motor 37, but may be a turbine engine, ducted fan engine, or other aircraft engine in various embodiments. FIG. 3 also shows gondola 14 extended from frame 12. FIG. 4 shows a side view of the airship 10 of FIGS. 1–3 with one hull 18 removed for the view. Propulsion units 30 force air flow in the lateral direction indicated by arrows 33 to propel the airship 10 by reaction forces.

Figure 5:
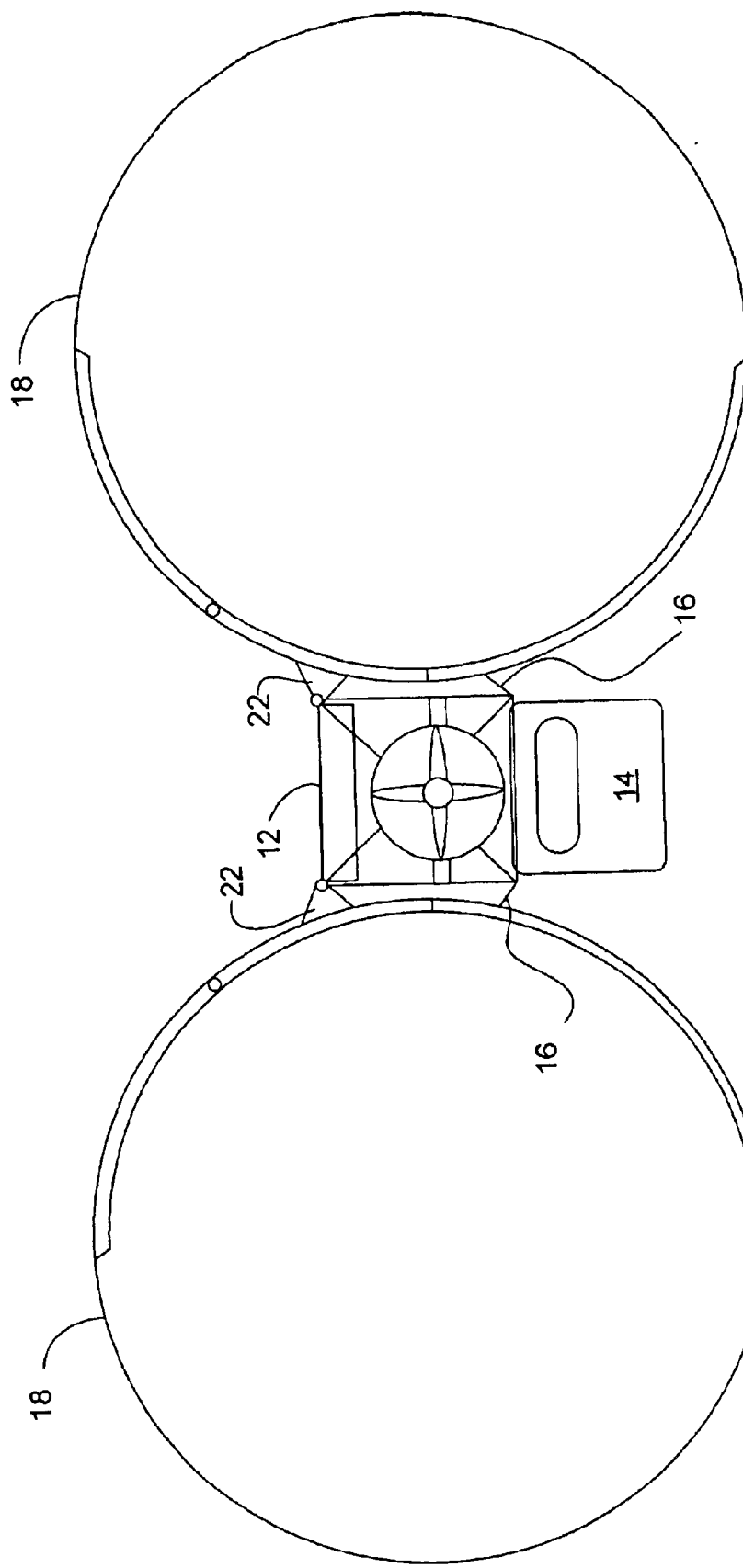
FIG. 5 is an end view of the exemplary airship of FIG. 1 with hulls pivoted downward.
Figure 6:
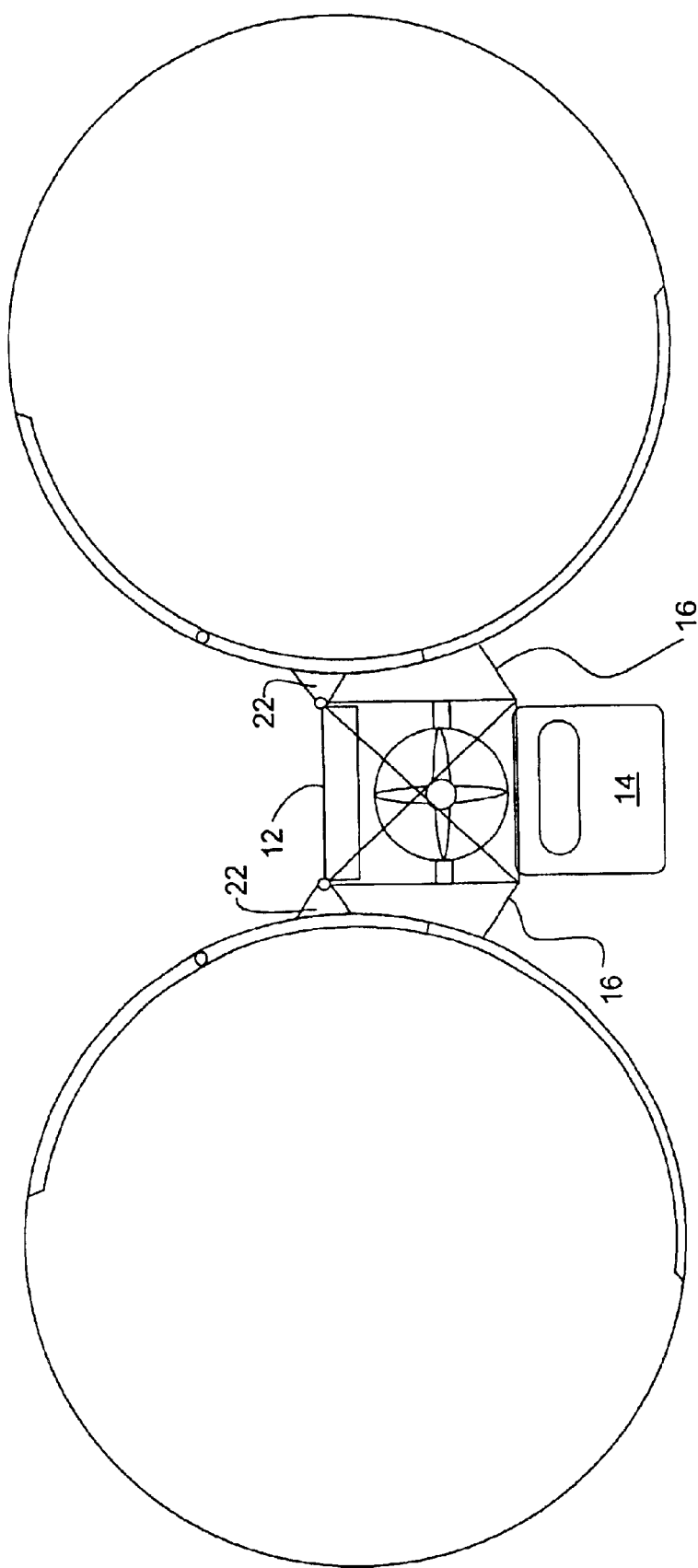
FIG. 6 is an end view of the exemplary airship of FIG. 1 with hulls pivoted downward and the gondola extended.

FIG. 5 shows exemplary airship 10 of FIGS. 1–4 with the hulls 18 pivoted to a lower position relative to frame 12 and with actuators 16 appropriately contracted to achieve the desired pivoting. The hulls 18 are shown in a position lower than that used for landing. FIG. 6 shows airship 10 with hulls 18 in the configuration for a three point landing with the gondola 14 extended from the frame 12 in the landed position. Because the center of buoyant lift is generally at a midpoint on an imaginary line connecting the centers of hulls 18, the lowering of the gondola 14 can be seen by the casual observer to improve the relationship between the center of buoyant lift and the center of mass, as discussed above. It will be understood that a three-point landing is also possible with the hulls 18 positioned to have the bottom outer surface of the hulls 18 approximately level with the bottom outer surface of the frame 12.

Figure 7:
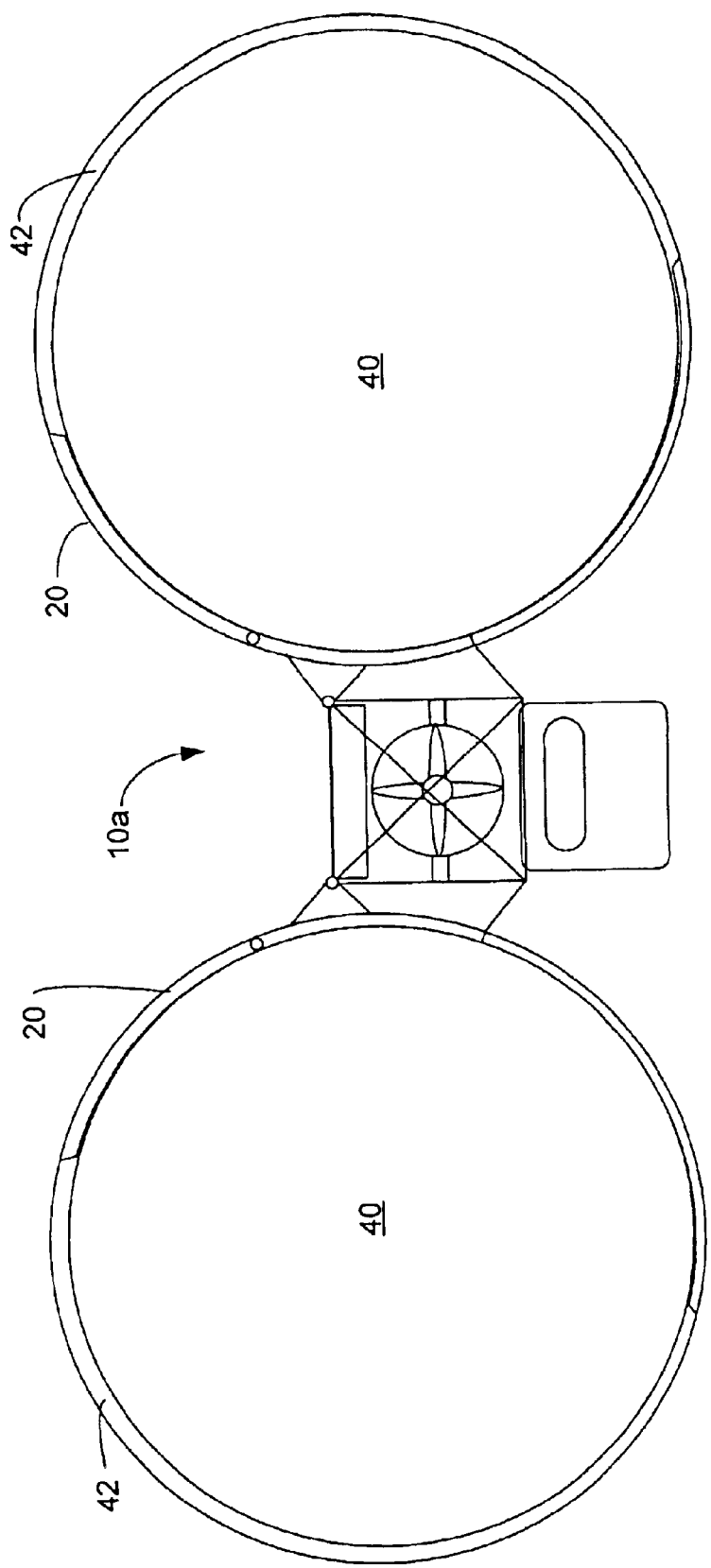
FIG. 7 is an end view of the exemplary airship illustrating dual concentric gas bags in each hull.

FIG. 7 shows an exemplary airship 10a that has dual concentric chambers 40 and 42 for lifting gases such as hydrogen and helium, respectively. By surrounding the hydrogen chamber 40 with a helium chamber, some improvement in safety may be obtained, especially where hull materials 1700 (FIG. 17) incorporating electronic or electrical devices are in use. The exact relative dimensions of hydrogen chamber 40 to helium chamber 42 may be made on a case-by-case basis, considering particular hull breach mechanisms (gunfire, electrical short, lightning, and the like), whether the airship is remotely piloted or has humans on board, and the weight of the material between the two chambers 40, 42. A purging system may be coupled to chamber 42 for removing hydrogen from the helium. FIG. 7 is not drawn to scale and is not intended to limit the present invention.

Figure 8:
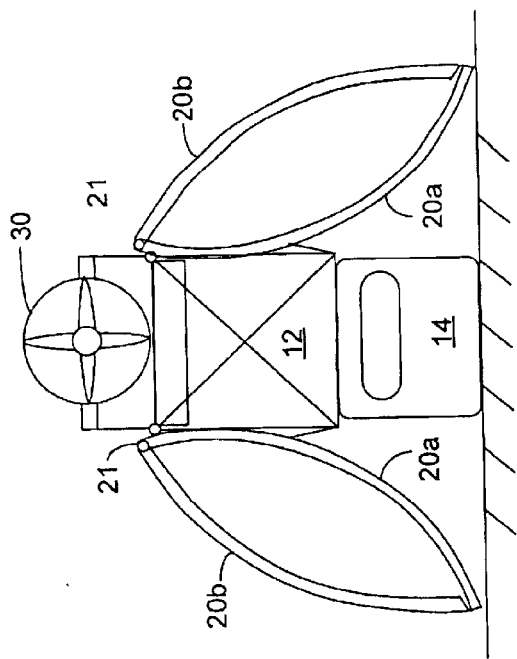
FIG. 8 is an end view of an exemplary airship having a 3-part semi-dirigible hull structure in a landed position with the hulls collapsed.
Figure 9:
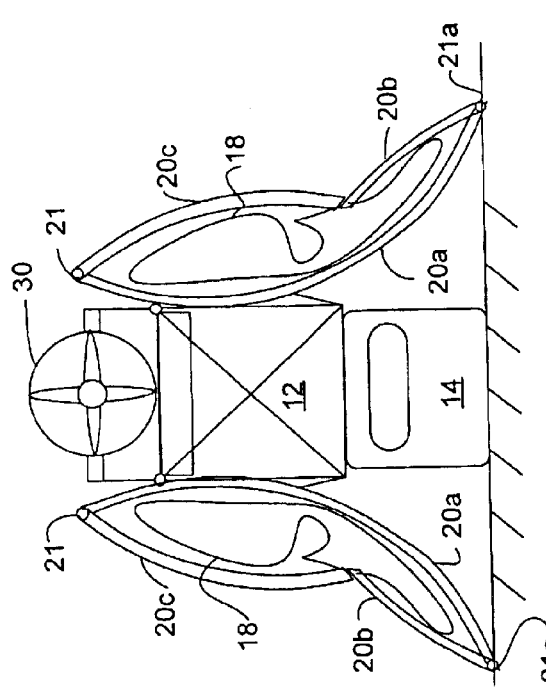
FIG. 9 is an end view of an exemplary airship having a 2-part semi-dirigible hull structure in a first landed position with the hulls collapsed and gondola extended.
Figure 10:
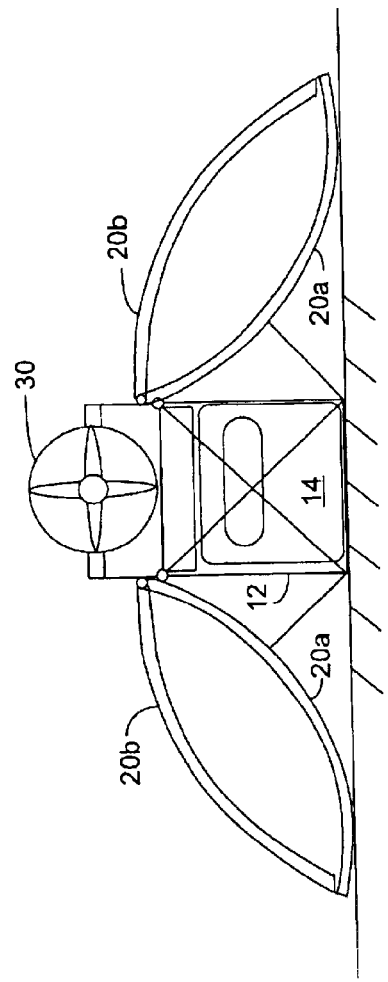
FIG. 10 is an end view of an exemplary airship having a 2-part semi-dirigible hull structure in a second landed position with the hulls collapsed and gondola retracted.

FIG. 8 shows an exemplary airship landed with the gondola 14 extended from frame 12 and the hulls 18 collapsed. The hull structure 20 sections 20a, 20b, and 20c are folded at pivots 21 and 21a (which may be spars 202 and 204) with a flexible portion of hull 18 inside the folds. The folded sections 20a, 20b, and 20c may provide environmental protection for gondola 14 to be used as a habitat. Hulls 18 may be collapsed by pumping the lifting gas out of chamber 40 and, as appropriate, chamber 42, and unlocking pivots 21 and 21a. In a particular embodiment, the folding of sections 20a, 20b, and 20c may be motorized. The lifting gas that is removed from the exemplary airship may be stored on board the airship 10, at a ground storage facility, may be used as fuel to conduct ground operations, or may simply be vented. For example, in an environment with ample supplies of water and solar energy, such as the Amazon rain forest, a research expedition may land, use the lifting gas as fuel to support research operations, and then generate additional hydrogen gas from water and solar energy for lifting and/or fuel before departing. Propulsion unit 30 may be powered by an electric motor and may be run as a wind generator to produce more hydrogen in environments where wind is adequate and sunlight may not be adequate (e.g., within the artic circles or in mountainous environments). FIG. 9 shows a similar configuration of the airship for a single pivot 21 between hull structure sections 20a and 20b. FIG. 10 shows a landed configuration of the airship of FIG. 9 with the gondola retracted.

Figure 11:
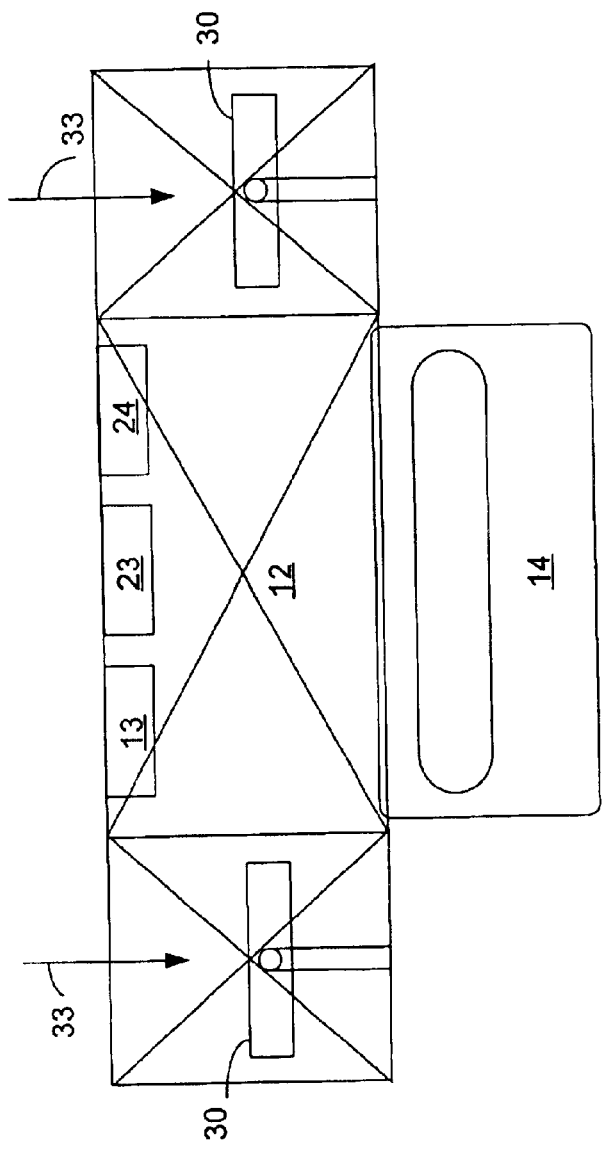
FIG. 11 is a side view of the exemplary aircraft in flight without lifting hulls with the gondola extended.
Figure 12:
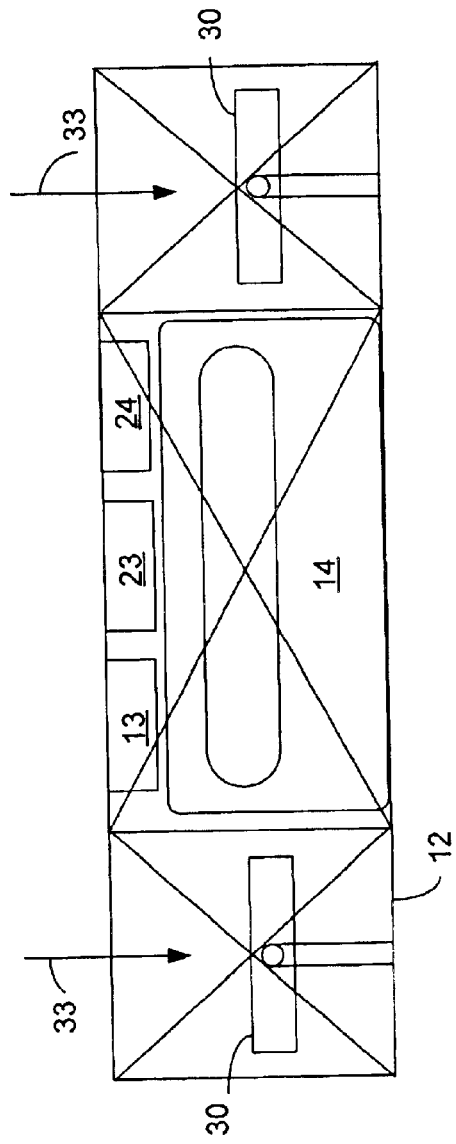
FIG. 12 is a side view of the exemplary aircraft in flight without lifting hulls with the gondola retracted.

FIGS. 11 and 12 show an exemplary frame 12, gondola 14, and propulsion units 30 being operated in a helicopter-like fashion with both lifting hulls detached. FIG. 11 shows the gondola 14 extended from frame 12 and FIG. 12 shows the gondola 14 retracted into frame 12. While the vectored propulsion units 30 are shown with one set of gimbals 31 each, it will be appreciated that double-gimbaling is also contemplated within the present invention. It will be appreciated that various configurations of frame 12, gimbals 31, gondola 14, and propulsion units are contemplated, including but not limited to those described in the provisional patent application SNo. 60/425,167 filed Sep. 30, 2002, the disclosure of which is incorporated herein by reference.

Figure 13:
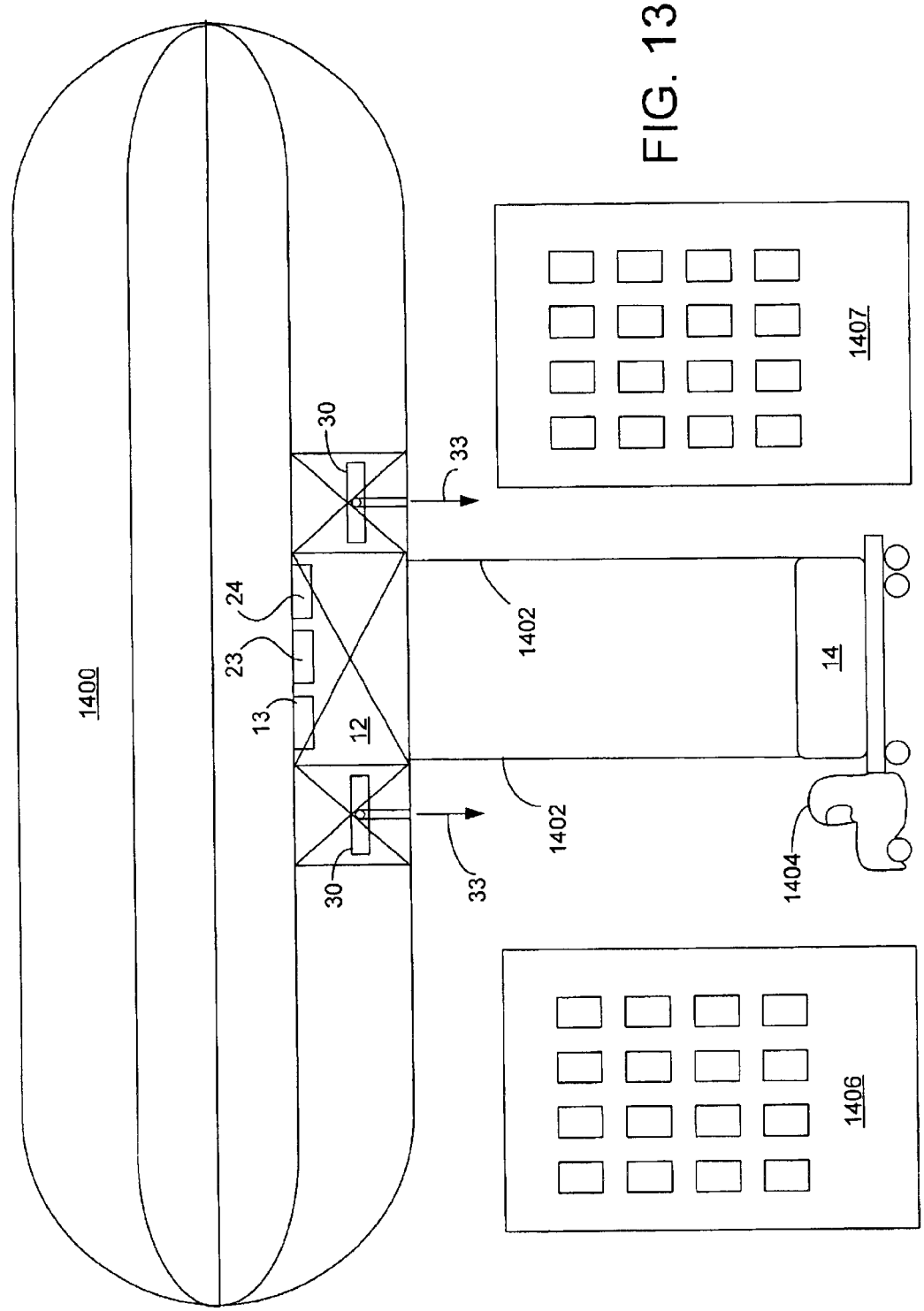
FIG. 13 is a side view of an exemplary airship lowering a cargo gondola onto surface transportation in an environment adverse to landing.

FIG. 13 depicts an exemplary airship 1400 lowering gondola 14 onto transportation device 1404 by cables 1402 in a difficult landing environment created by buildings 1406 and 1407. Gondola 14 may be an ISO cargo container. While ground transportation device 1404 is depicted as a truck, it will be understood that any transportation device 1404, including trains, conveyors, ships, barges, and submarines may be loaded in this manner. It will also be appreciated from FIG. 13 that gondola 14 may be landed on a surface, such as a loading dock, using cables 1402. Various conventional cable 1402 configurations, including a conventional lowering apparatus having a single cable 1402, are also contemplated. It will also be appreciated from FIG. 13 that gondola 14 may be lowered into water. For example, gondola 14 may be a water container used in fighting forest fires and may be filled by lowering it into a lake or river. Many other applications for an extendable gondola are also contemplated. For example, partially isolating a sensor suite from the vibration environment created by running propulsion unit 30 may be achieved by lowering the sensor suite in a gondola.

Figure 14:
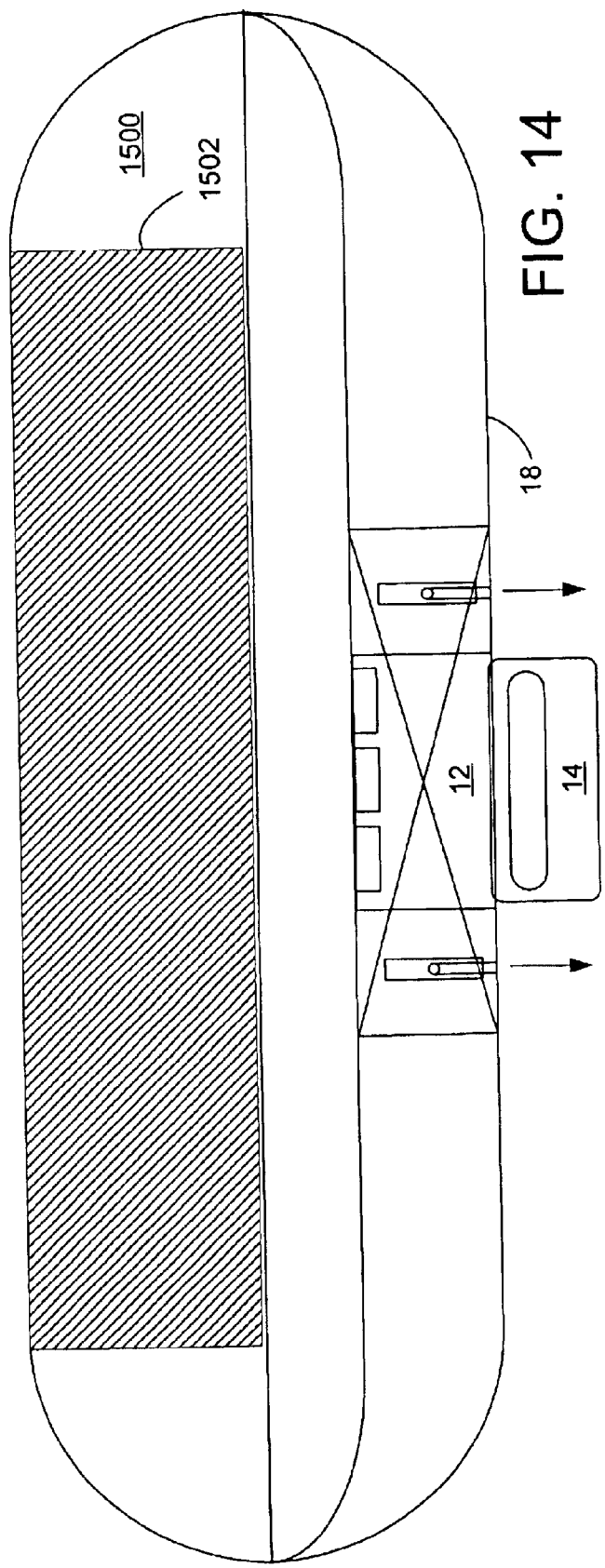
FIG. 14 is a side view of an exemplary airship having flexible photovoltaic arrays on the exterior of the airship.
Figure 15:
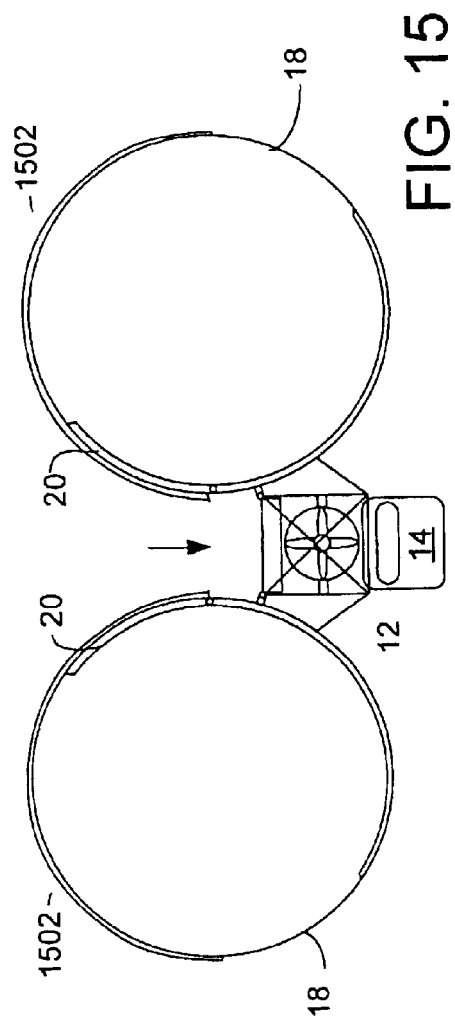
FIG. 15 is an end sectional view of an exemplary airship having flexible photovoltaic arrays on the exterior of the airship.
Figure 17:
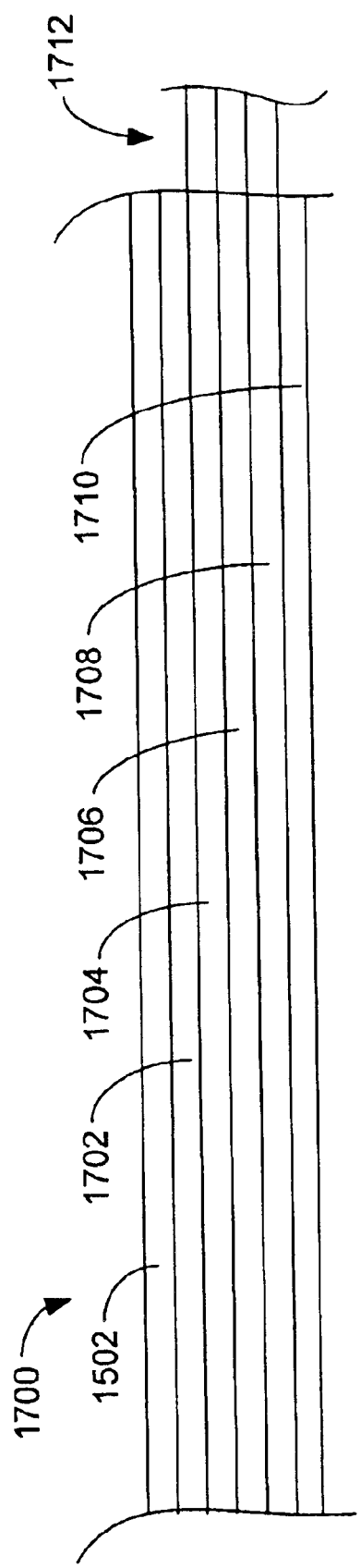
FIG. 17 is a cross-sectional view of an exemplary hull material comprising a capacitor.
Figure 21:
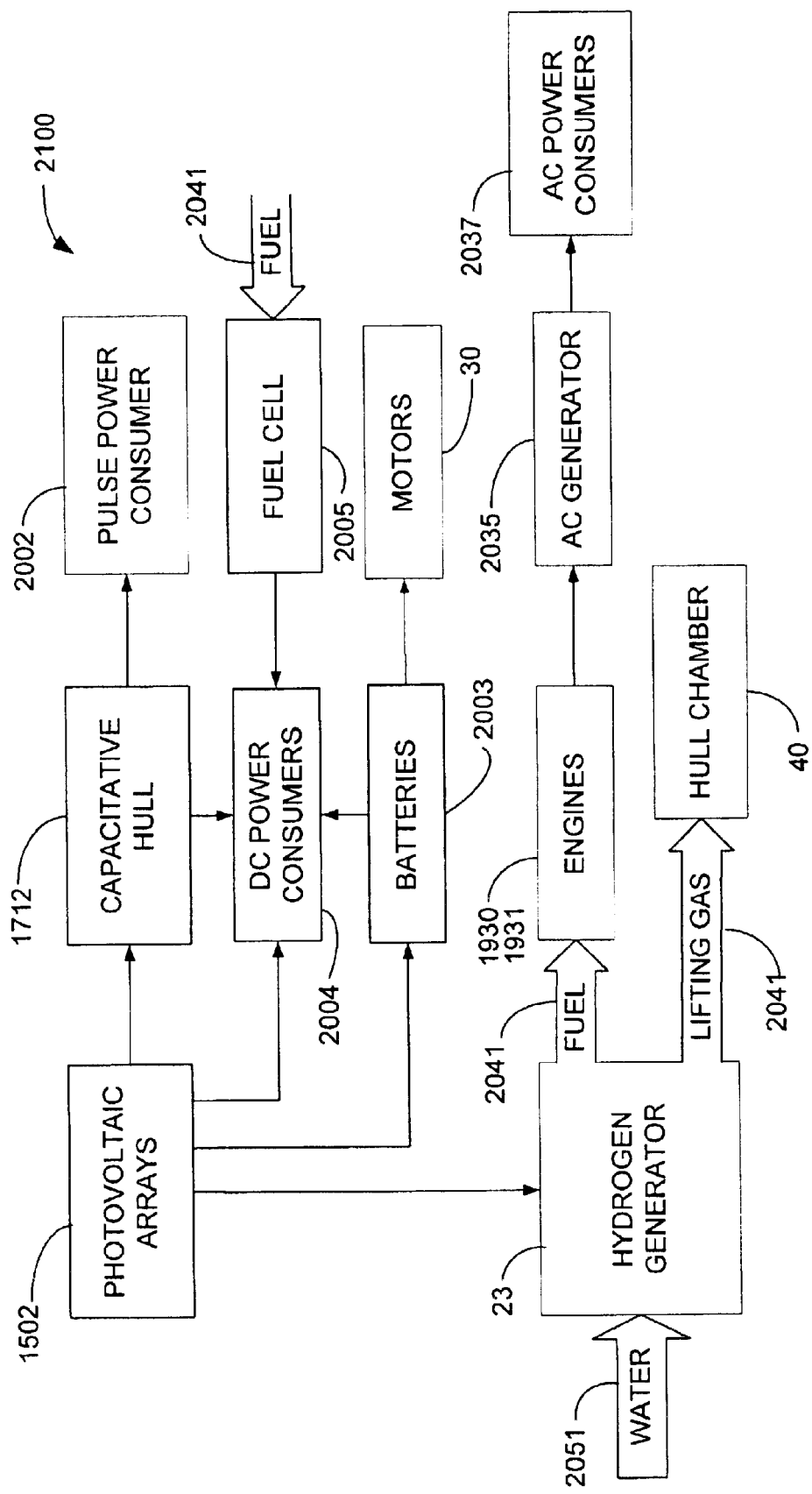
FIG. 21 is a block diagram of an exemplary electrical power system for the exemplary airship.

FIGS. 14 and 15 depict airship 1500 having one or more flexible photovoltaic arrays 1502 mounted on hulls 18. Electricity produced by the photovoltaic arrays 1502 may be used directly by propulsion unit 30 or other direct current (DC) consumers onboard or may be stored in batteries 2003 as shown in FIG. 21 or capacitor 1702 as shown in FIG. 17 for later use, as described in more detail below. In most embodiments, the photovoltaic arrays 1502 will be thin-film solar arrays 1502. In particular embodiments configured for exploration in the atmospheres of other celestial bodies, photovoltaic arrays 1502 adapted to light conditions in those environments may be used. For example, an embodiment configured to explore Titan, a moon of Saturn, may be configured to convert infrared radiation emitted by Saturn in preference to solar energy. Photovoltaic arrays 1502 may alternatively be configured to convert artificial light into electricity, where the arrays 1502 are placed on the underside of the hulls 18 and are illuminated from one or more surface-based lights. For example, a airship 1500 used in long duration flight over a predetermined geographical area as a cellular telephone relay station may be supplied with electric power by laser on a continuous, periodic, or emergency basis. For further example, an airship 1500 configured for law enforcement patrol over urban areas may acquire power from waste light from the urban environment. Those of skill in the art will recognize that various configurations of arrays 1502 on airship 1500 that may be useful.

Figure 16:
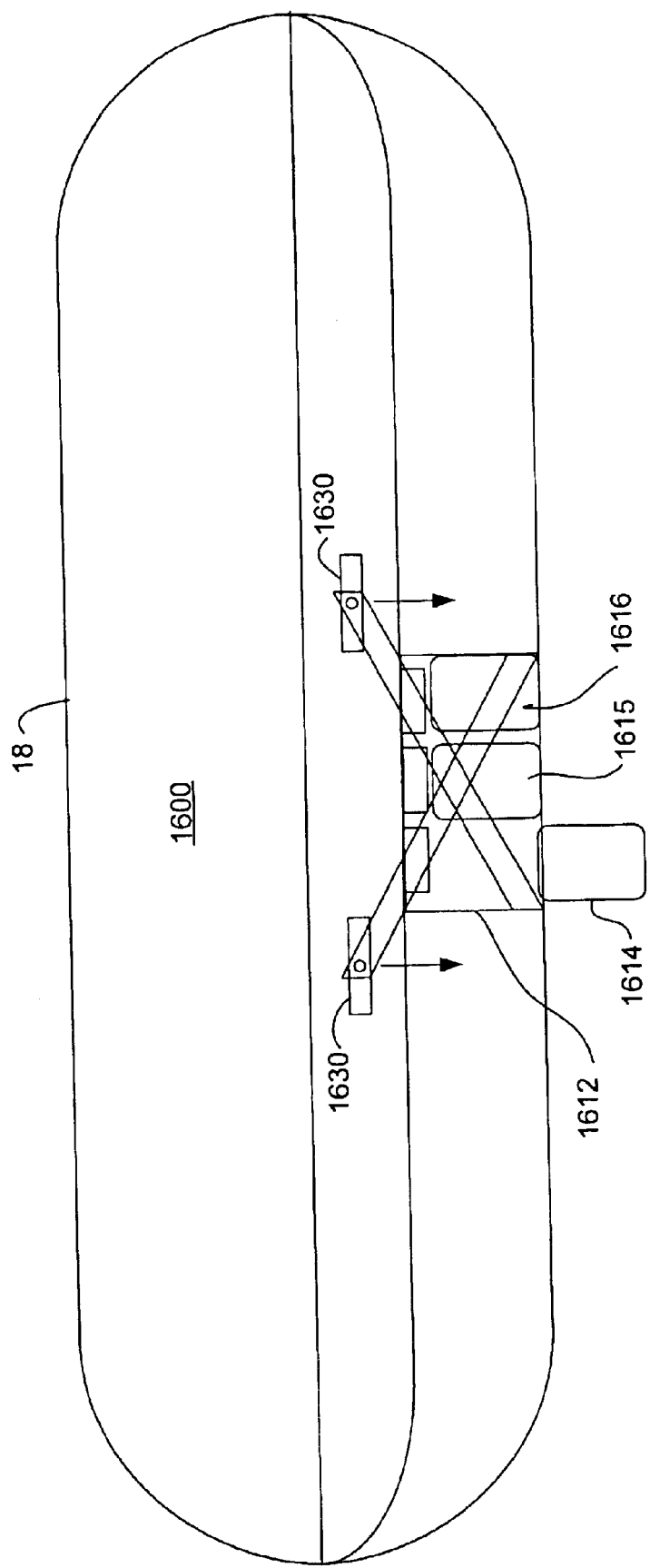
FIG. 16 is a side view with an exemplary airship having a plurality of gondolas in a single frame.

FIG. 16 depicts airship 1600 having frame 1612 adapted to extend and retract a plurality of gondolas 1614–1616. Frame 1612 may be of the same dimensions as frame 12 or, in various embodiments, may be sized for various respective requirements. Airship 1600 is depicted as a cargo carrier, but other uses are possible. The gondolas 1614–1616 may all be retractable, fixed, or combinations thereof. For example, one gondola may be a fixed flight deck and other gondola may be cargo containers. FIG. 16 also shows an alternate embodiment of directionally controllable propulsion units 1630 mounted on extensions of the frame 1612. The alternate positioning of propulsion units 1630 raises the center of lift and may be of use in embodiments where the mass of the propulsion units 1630 is small compared to the mass of the airship and cargo.

FIG. 17 depicts a cross section of an exemplary hull 18 material 1700. The top layer is shown as a photovoltaic array 1502. Layer 1702 may be a structural layer made of a light-weight high-tensile strength material, such as aramid fibers. Layers 1704, 1706, and 1708 comprise a capacitative layer 1712, where layers 1704 and 1708 are conductors and layer 1706 may be a dielectric. Layer 1710 is an insulator and has a low permeability to the selected lifting gas. In a simpler embodiment, only layer 1702 may be present. FIG. 17 is not to scale, and the capacitor 1712 an the insulator 1710 may be substantially thinner than layer 1702. For example, hull capacitor 1712 may be an metalized dielectric similar in physical dimensions to aluminized mylar. Hull capacitor 1712 may be an arrangement of electrically distinct capacitors, arranged in parallel or series as desired, to provide electrical power storage.

Figures 18, 19:
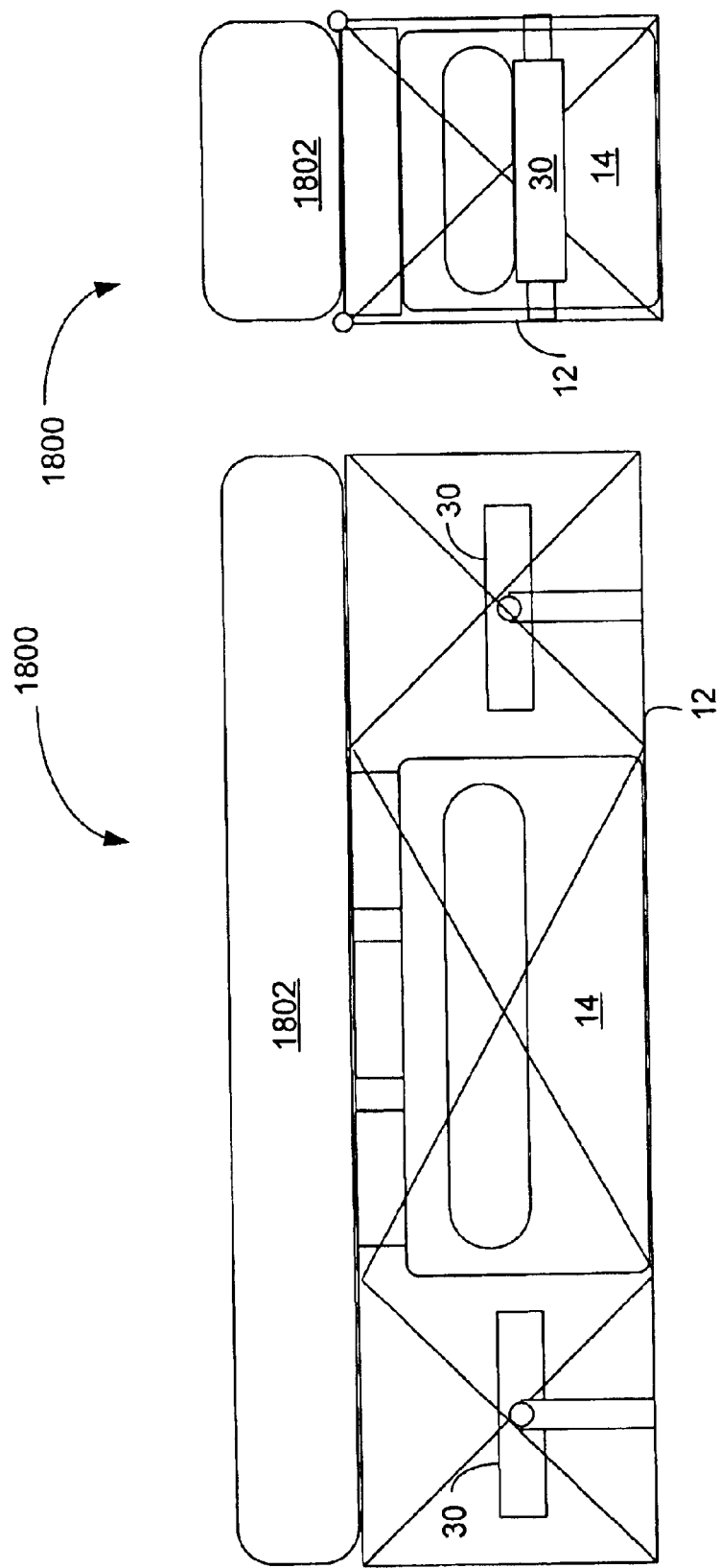
FIG. 18 is a side view of the airship with the hulls collapsed and stowed for insertion into an ISO shipping container.
FIG. 19 is an end view of the airship with the hulls collapsed and stowed for insertion into an ISO shipping container.

FIGS. 18–19 depict exemplary airship 1800 stowed for insertion into an ISO shipping container. Hulls 18 (FIG. 1) have been collapsed and folded into exemplary stowing configuration 1802. Various stowing configurations 1802 are possible, including underneath the propulsion units, underneath the frame 12, or in the gondola 14. Airship 1800 may have a substantially smaller hull structure 20 (FIG. 1) than airships not intended for stowage in an ISO container. In some embodiments, airship 1800 is designed to be extracted from the ISO container and inflated and flown without further assembly. In other embodiments, the hulls 18 (FIG. 1), including hull structures 20 (FIG. 1) may be completely removed for stowage and so may require reassembly before flight.

Figure 20:
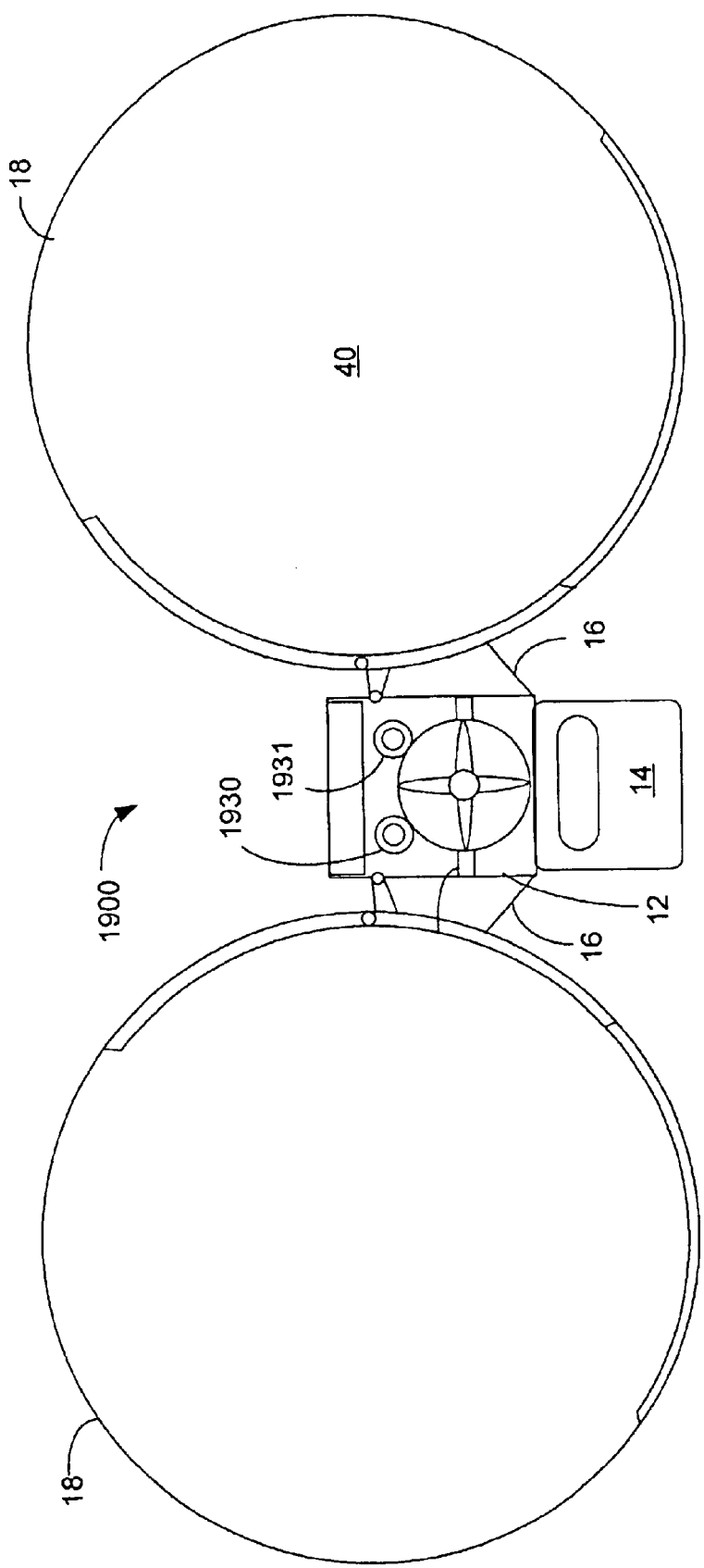
FIG. 20 is an end view of the exemplary airship of FIG. 1 showing an additional, second type of thruster.

FIG. 20 shows additional propulsion units 1930 and 1931, optionally using a different fuel or power source, attached to and gimbaled (see 31) with propulsion unit 30, but other configurations which permit control of the direction of thrust of propulsion units 30, 1930, and 1931 are also contemplated. FIG. 20 is not intended to limit the number or the placement of propulsion units 30, 1930, and 1931 on airship 1900. Hull structures 20 may be pivoted on the upper edges of extended frame 12. In a particular embodiment, additional propulsion units 1930 and 1931 may be attached to hull structures 20.

FIG. 21 shows a block diagram of an exemplary electrical power system 2100 for an airship. Photovoltaic arrays 1502 supply electrical power to DC power consumers 2004 or a hydrogen generator 23 for immediate use and to batteries 2003 and hull capacitor 1712 for storage. Electric motor of propulsion unit 30 may draw electrical power from batteries or any other source of electrical power 1502, 2005, 1712 on board. Hull capacitor 1712 may supply one or more pulse power consumers 2002, such as lasers used for military or active sensing purposes. Fuel cell 2005 may provide DC power to DC power consumers 2004 and consume hydrogen fuel 2041 produced by hydrogen generator 23. Hydrogen generator 23 consumes DC power and water 2051 and produces hydrogen lifting gas 2041 for hull chamber 40 as well as hydrogen fuel for engines 1930, 1931. Engines 1930, 1931 may run generators 2035 for producing AC power for supply to AC power consumers 2037. It will be appreciated that various configurations of the electrical power system 2100 using all or some of the components shown are contemplated. For example, a connection between engines 1930 and 1931 and the hull chamber 40 may be added to permit sacrifice of lifting gas for propulsion in certain circumstances. In some embodiments, the hydrogen generator 23 may be part of a ground support unit for the airship, and may be a mobile ground support unit.

FIGS. 22–25 depict various exemplary hulls 2218, 2418, 2518 and exemplary hull structures 2220, 2420, 2520 adapted for landing on water 2051. FIG. 22 shows a first configuration of exemplary airship 2200 with elliptical hulls 2218 lowered and landed in water 2051. FIG. 23 shows airship 2200 with the elliptical hulls 2218 raised. Note that the hull structure 2220 supports the hull 2218 from underneath for the submerged portion of the airship 2200 and avoids strain concentrations at the end of the semi-dirigible hull structure 2220. FIG. 24 shows hulls 2418 having a rectangular cross-section with a completely dirigible hull structure 2420 landed in water 2051. FIG. 25 depicts airship 2500 having a reduced portion submerged in water 2051 where a substantial amount of lift is still derived from air buoyancy as compared to water 2051 buoyancy. In some embodiments, the submerged portions of hulls 2518 are shaped as catamaran hulls.

Figure 26:
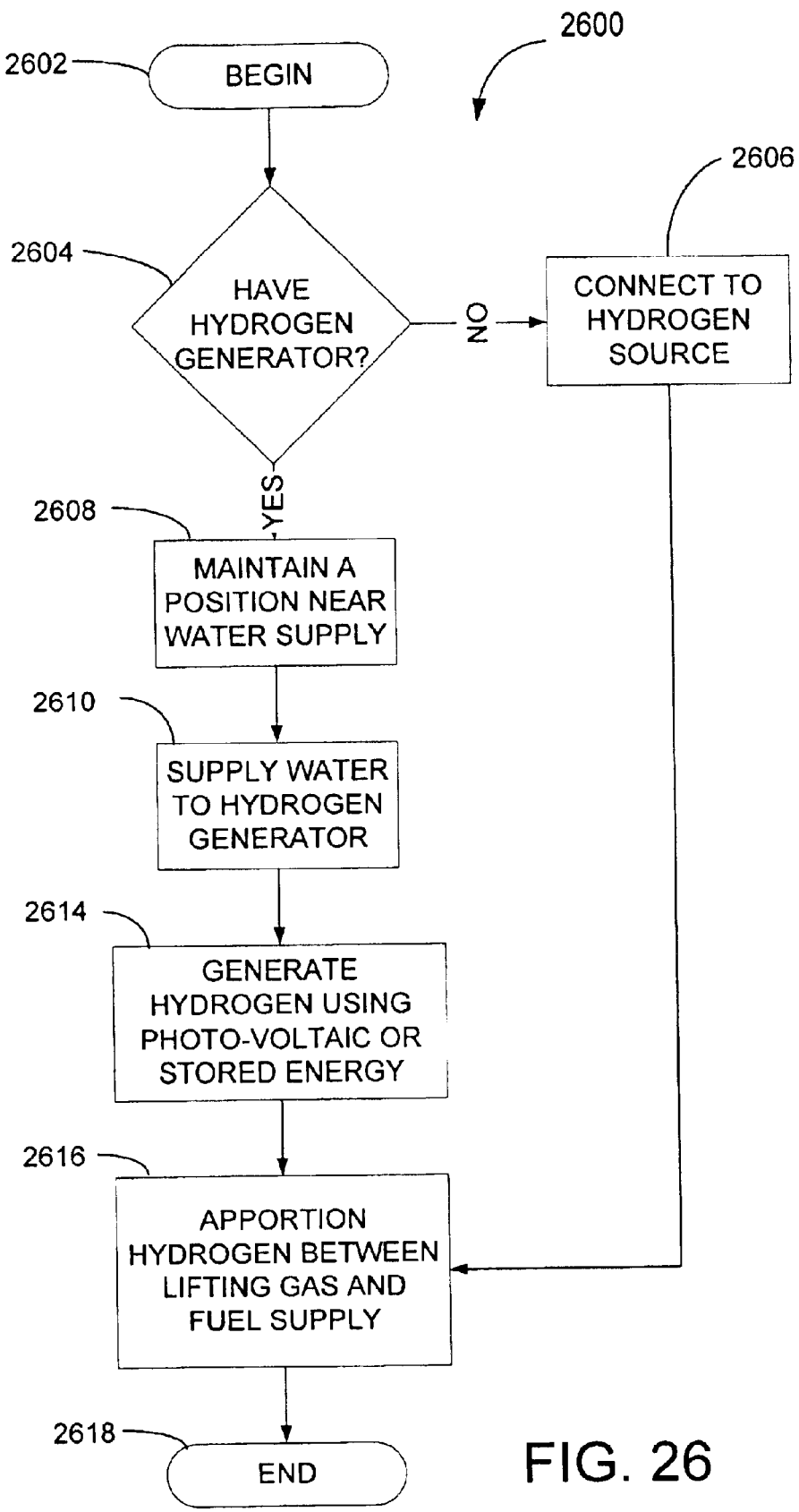
FIG. 26 is a flowchart of an exemplary process of supplying hydrogen to an exemplary airship.

FIG. 26 is a flowchart of an exemplary method of refueling an airship 10. The exemplary method begins in step 2602 with a need for hydrogen fuel. Step 2604 determined if a hydrogen generator 23 is onboard. If step 23 determines that no hydrogen generator 23 is on board, then a source of hydrogen, such as a refueling station on the Earth's surface, is found and used in step 2606. The hydrogen source used in step 2606 need not be terrestrial, but may be another airship 10. After the hydrogen is acquired in step 2606, it may be apportioned between fuel 2041 and lifting gas 2041 requirements in step 2616 before the method ends in step 2018. If step 2604 determines that a hydrogen generator 23 is available, the airship is brought into proximity to water 2051 in step 2608. The water 2051 may be conventionally electrolyzed with DC current to produce hydrogen 2041. The source of water may be an ocean, lake, river, cloud, fog bank, snow field, or the like. In step 2610, some of the proximate water is supplied to the hydrogen generator 23 by any conventional means or by acquiring water 2051 as mentioned in relation to FIG. 13. The hydrogen generator, in step 2614, consumes DC power to produce hydrogen 2041 which is allocated, in step 2616, between engine fuel 2041 and lifting gas 2041 requirements. The method ends in step 2618 with a full fuel tank and/or lifting gas chamber 40. The method can take place aloft, on land, or on water or in various sequences thereof.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An airship comprising:
    a frame;
    a gondola moveably coupled to said frame;
    first and second hulls pivotally coupled to said frame; and
    a propulsion system connected to said frame.
2. The airship of claim 1, further comprising an electrical power system.
3. The airship of claim 2, further comprising flexible photo-voltaic arrays on at least a portion of at least one of said first and second hulls.
4. The airship of claim 3, further comprising a hydrogen generator.
5. The airship of claim 2, wherein said hulls have a flexible hull material, said flexible hull material comprising a capacitor.
6. The airship of claim 1, wherein said frame comprises a composite material.
7. The airship of claim 1, wherein said gondola is vertically extendable and retractable relative to said frame.
8. The airship of claim 7, wherein said gondola comprises at least one ISO shipping container.
9. The airship of claim 7, wherein said gondola comprises a plurality of gondolas.
10. The airship of claim 1, wherein said hulls are semi-dirigible.
11. The airship of claim 10, wherein said first and second hulls each have at least one rigid hull frame portion proximate said pivotable connection to said frame.
12. The airship of claim 10, wherein said first and second hulls each have at least one rigid hull structure portion configured to support a submerged portion of each hull during a landing on water.
13. The airship of claim 12, wherein said rigid hull structure portion is configured to be folded.
14. The airship of claim 10, wherein said hulls are at least partially collapsible.
15. The airship of claim 14, wherein said airship is configurable to be stored in an ISO container by collapsing, folding, and pivoting said first and second hulls.
16. The airship of claim 14, wherein said airship is configurable to be a terrestrial habitation when landed on a supportive surface and said first and second hulls are collapsed.
17. The airship of claim 1, wherein said first and second hulls each comprise an inner gas envelope and an outer gas envelope.
18. The airship of claim 17, wherein said inner gas envelope is configured to contain hydrogen and said outer gas envelope is configured to contain helium.
19. The airship of claim 1, wherein said first and second hulls are configured and pivotal to provide buoyancy for the airship in water.
20. The airship of claim 1, wherein said propulsion system comprises directionally controllable thrusters.
21. The airship of claim 20, wherein at least one thruster of said directionally controllable thrusters is controllable over an angle of ninety degrees relative to said frame.
22. The airship of claim 20, wherein at least one thruster of said directionally controllable thrusters is controllable over an angle of two-hundred and seventy degrees relative to said frame.
23. The airship of claim 20, wherein said propulsion system comprises thrusters of more than one type.
24. An airship comprising;
    a frame; and
    first and second hulls independently pivotally coupled to said frame.
25. The airship of claim 24, further comprising a gondola vertically extendable and retractable relative to said frame.
26. The airship of claim 24, further comprising directionally controllable thrusters connected to said frame.
27. A method of landing an airship on water, wherein the airship has a frame in which a retractable and extendable gondola is disposed, first and second hulls pivotally connected to said frame, and directionally controllable thrusters connected to said frame, the method comprising the steps of:
    pivoting said first and second hulls relative to said frame to place a buoyant volume of said first and second hulls below said frame; and
    controlling said thrusters to lower the airship into the water.
28. The method of claim 27, wherein said gondola is extended, the method further comprising the step of retracting the gondola.
29. A method of refueling an airship comprising the step of:
    acquiring hydrogen; and
    apportioning the hydrogen for fuel and lifting gas.
30. The method of claim 29, wherein the step of acquiring hydrogen comprises the step of electrolyzing water onboard the airship.

* * * * *